US011294451B2

(12) United States Patent
Lee

(10) Patent No.: US 11,294,451 B2
(45) Date of Patent: *Apr. 5, 2022

(54) VIRTUAL REALITY SYSTEM CAPABLE OF COMMUNICATING SENSORY INFORMATION

(71) Applicant: QUBIT CROSS LLC, Washington, DC (US)

(72) Inventor: Yoonhee Lee, Mclean, VA (US)

(73) Assignee: QUBIT CROSS LLC, McLean, VA (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/670,189

(22) Filed: Oct. 31, 2019

(65) Prior Publication Data

US 2020/0064909 A1 Feb. 27, 2020

Related U.S. Application Data

(63) Continuation of application No. 15/481,509, filed on Apr. 7, 2017, now Pat. No. 10,551,909.

(51) Int. Cl.
*G09G 5/00* (2006.01)
*G06F 3/01* (2006.01)

(52) U.S. Cl.
CPC .............. *G06F 3/011* (2013.01); *G06F 3/016* (2013.01)

(58) Field of Classification Search
CPC .................................. G06F 3/011; G06F 3/016
See application file for complete search history.

(56) References Cited

U.S. PATENT DOCUMENTS

| 2010/0245237 | A1* | 9/2010 | Nakamura | A63F 13/02 345/156 |
| 2011/0148607 | A1 | 6/2011 | Zeleny | |
| 2016/0035132 | A1* | 2/2016 | Shuster | G06T 19/006 345/633 |
| 2016/0235323 | A1 | 8/2016 | Tadi et al. | |

FOREIGN PATENT DOCUMENTS

WO    WO2015044851 A2    4/2015

\* cited by examiner

*Primary Examiner* — Adam R. Giesy
(74) *Attorney, Agent, or Firm* — CL Intellectual LLC

(57) ABSTRACT

The disclosure describes a virtual reality system, including: a database configured to store sensory information paired with at least one virtual object; a virtual reality rendering unit to render the virtual object, where the virtual reality rendering unit is configured to render a virtual representation of a user of the system; a signal control unit configured to be connected to the virtual reality rendering unit; and a sensory stimulation unit comprising one or more sensory stimulators, where the one or more sensory stimulators are configured to be connected to at least part of an actual body of the user of the system, where the signal control unit is further configured to communicate the sensory information to the sensory stimulation unit upon interaction between the virtual object and the virtual representation in the virtual reality, and where the one or more sensory stimulators are configured to stimulate the part of the user's actual body based on the sensory information.

18 Claims, 5 Drawing Sheets

VIRTUAL REALITY SYSTEM CAPABLE OF COMMUNICATING SENSORY INFORMATION

CROSS-REFERENCE TO RELATED APPLICATIONS

This application is a Continuation of U.S. patent application Ser. No. 15/481,509 filed Apr. 7, 2017, which claims the priority of U.S. Provisional Application No. 62/319,754 filed on Apr. 7, 2016, the disclosures of which are incorporated by reference in their entireties.

TECHNICAL FIELD

The invention generally relates to a virtual reality system and method for sensory communication. More specifically, the invention relates to a virtual reality system and method for sensory communication through sensory device.

BACKGROUND

Virtual reality technology has progressed from cartoonish imaginations into practical and useful applications. One known genre of applications is known as diagnosis applications. Virtual reality diagnosis applications allow users to evaluate important sensory interactions. The applications of virtual reality technology are unlimited. In training applications, virtual reality technology allows users experience various challenging environments without subjecting them to the hazards or costs of training in real environments. Traditional communication methods between the virtual reality environment and the user are often established by visual information via the user's eyes. Although the subjective content of a virtual reality world may only be limited in terms of imagination or desired reality, interaction with the virtual world only with visual information significantly limits the scope of user experience.

DISCLOSURE OF INVENTION

The disclosure describes a virtual reality system, including: a database configured to store sensory information paired with at least one virtual object; a virtual reality rendering unit to render the virtual object, where the virtual reality rendering unit is configured to render a virtual representation of a user of the system; a signal control unit configured to be connected to the virtual reality rendering unit; and a sensory stimulation unit comprising one or more sensory stimulators, where the one or more sensory stimulators are configured to be connected to at least part of an actual body of the user of the system, where the signal control unit is further configured to communicate the sensory information to the sensory stimulation unit upon interaction between the virtual object and the virtual representation in the virtual reality, and where the one or more sensory stimulators are configured to stimulate the part of the user's actual body based on the sensory information.

DESCRIPTION

The disclosure may be understood more readily by reference to the following detailed description taken in connection with the accompanying figures and examples, which form a part of this disclosure. It is to be understood that the disclosure is not limited to the specific devices, methods, applications, conditions or parameters described and/or shown herein, and that the terminology used herein is for the purpose of describing particular embodiments by way of example only and is not intended to be limiting of the claimed invention. Also, as used in the description including the appended claims, the singular forms "a," "an," and "the" include the plural, and reference to a particular numerical value includes at least that particular value, unless the context clearly dictates otherwise. The term "plurality" as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the disclosure that are, for brevity, described in the context of a single embodiment, may also be provided separately or in any sub-combination. Further, reference to values stated in ranges includes each and every value within that range.

Figure 1:
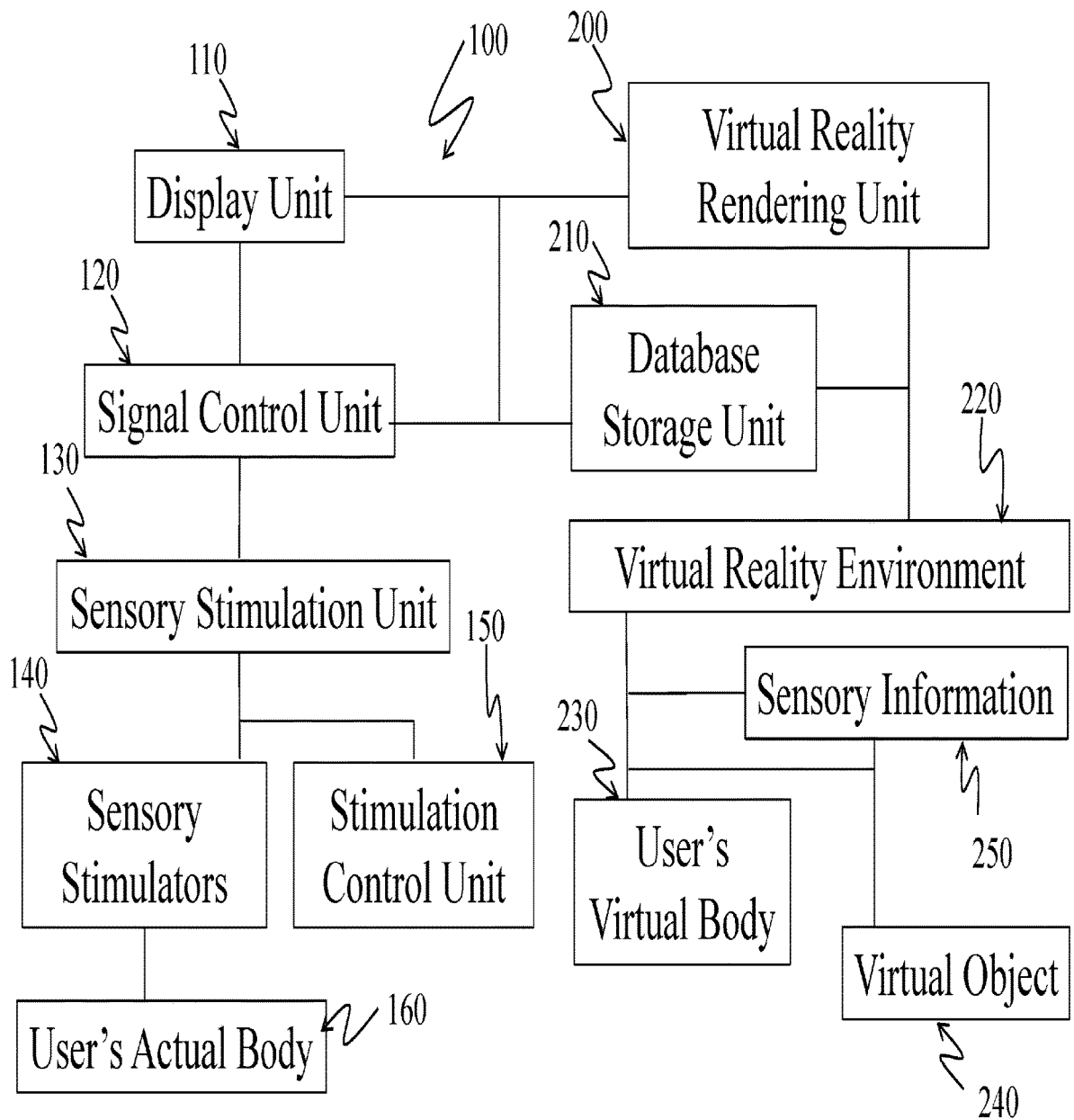
FIG. 1 shows a block diagram according to one embodiment of the disclosure.

In one aspect according to the disclosure, as shown in FIG. 1, the virtual reality system 100 includes a virtual reality rendering unit 200. In one aspect, the virtual reality rendering unit 200 may use a bussed architecture processor. The virtual reality rendering unit 200 may be configured to render a virtual reality environment 220. It is further contemplated that the virtual reality rendering unit 200 can use any known or later developed architectures, including ASIC, a programmed general purpose computer, discrete logic devices, etc.

As is understood, a virtual reality environment 220 can be designed to represent a wide variety of environments. Although an almost infinite range of such environments is contemplated by the disclosure, in one aspect according to the disclosure, the virtual reality environment 220 may contain one or more virtual objects 240 within the virtual reality environment 220. In another aspect, the virtual reality environment 220 may represent a three-dimensional environment space. In some aspect, the one or more virtual objects 240 may be paired with one or more sensory information 250. The virtual reality environment 220 may include at least partly a virtual representation of a user of the virtual reality system 100 within the virtual reality environment 220 in order to assist the user's interaction and navigation within the virtual reality environment 220.

The disclosure incorporates one or more sensory information 250 that the user can experience between actual reality and virtual reality. In one aspect according to the disclosure, interaction between the virtual object 240 and the virtual representation of the user within the virtual reality environment 220 involves sensory information 250 related to human senses such as visual information, auditory information, tactile information, olfactory information, neural information, chemical information, vibrational information, mechanical experience, pressure information, thermal information and the like. In some aspect, the interaction may involve one or more predetermined sensory information 250. For example, a fireplace in the virtual reality environment 220 may be paired with predetermined sensory information 250 such as temperature information related to the fireplace. In another aspect, a virtual object 240 may be paired with a plurality of sensory information 250. In various aspects, interaction with the virtual object 240 and the virtual representation of the user may be paired with predetermined sensory information so that different interactions with the same virtual object may be paired with different sensory information.

The virtual reality system 100 may include a signal control unit 120. In one aspect according to the disclosure, the signal control unit 120 may be configured to communicate and/or process sensory information with the virtual reality rendering unit 200. In some aspect, the signal control unit 120 may be configured to receive sensory information 250 of the virtual object 240 in the virtual reality environment 220. In various aspects, interaction between the visual representation of the user and the virtual object in the virtual reality environment 220 may trigger the signal control unit 120 to receive and/or process the sensory information 250 of the virtual object and/or the sensory information related to the interaction. Optionally, the signal control unit 120 may be detachably connected to the virtual reality system 100.

The virtual reality system 100 may include a sensory stimulation unit 130. The sensory stimulation unit 130 may include one or more sensory stimulators 140 capable of generating sensory signals. The sensory signals may include electric signals, olfactory signals, mechanical signals, vibrational signals, pressure signals, tactile signals, gaseous signals, thermal/temperature signals, neural signals, chemical signals, or a combination thereof. In one aspect, the sensory stimulation unit 130 may be configured to determine and/or process the types and/or locations of the sensory stimulators 140 connected to the user's actual body.

One or more sensory stimulators 140 are configured to stimulate skin, external/internal muscles and/or sensory organs of the user's actual body 160. For example, one or more sensory stimulators 140 may be configured to be attached to a sensory organ of the user's actual body 160 so that the sensory organ can be electrochemically stimulated by the sensory stimulators 140. In another example, one or more sensory stimulators 140 may be configured to be attached to skin of the user's actual body 160 so that the skin can be thermally stimulated by the sensory stimulators 140. In certain aspect, depending on the types of sensory signals, the configuration of connection between the sensory stimulators 140 and the user 160 may be adjusted.

In one embodiment according to the disclosure, the signal control unit 120 may be communicatively connected to the sensory stimulation unit 130. In some aspect, interaction between the visual representation of the user 230 and the virtual object 240 in the virtual reality environment 220 may trigger the signal control unit 120 to receive and/or process the sensory information 250 of the virtual object. In various aspects, the signal control unit 120 may be configured to receive and/or process sensory information 250 related to interaction between the visual representation of the user 230 and the virtual object 240. The signal control unit 120 may be configured to communicate the received/processed sensory information 250 with the sensory stimulation unit 130 so that the sensory stimulator 140 can stimulate the user's actual body 160 based on the sensory information 250.

In another embodiment, the signal control unit 120 may be configured to determine types and/or locations of the sensory stimulators connected to the user's actual or physical body. In one aspect, the signal control unit 120 may communicate the determined the sensory stimulators with the virtual reality rendering unit 200. Based on the determined sensory stimulators, the virtual reality rendering unit 200 may determine sensory information associated and/or compatible with the determined sensory stimulators.

In some aspect, the signal control unit 120 may include a brain computer interface to concurrently use cortical physiologies associated with different cognitive processes for device control. The brain computer interface may be connected to at least part of the user's actual body. In various aspects, the brain computer interface may be configured to receive a brain signal of the user. The brain signal may include ipsilateral motor signals and contralateral motor signals. In certain aspect, the brain signal may include a combination of speech signals with motor signals. Other signals that may also be selectively combined include attention-related signals, signals related to cortical plasticity or feedback, signals related to working memory, signals related to higher cognitive operations (e.g. mathematical processing), signals related to auditory processing, and/or signals related to visual perception. The brain computer interface is configured to process the brain signal. A device may be communicatively connected to the brain computer interface. The brain computer interface may be configured to control the device based on the brain signal.

In some embodiments, the term "brain computer interface" and the acronym "BCI" refer generally to signal-processing circuitry that acquires input in the form of raw cortical brain signals and converts the brain signals to a processed signal that is output to a computer for storage and/or further analysis. Moreover, in some embodiments, the term "BCI system" refers generally to a number of components, including a BCI that translates raw brain signals into control of a device.

In some embodiments, the term "device" refers generally to equipment or a mechanism that is designed to provide a special purpose or function. Exemplary devices including, but are not limited to, a cursor on a video monitor, computer software, environmental controls, entertainment devices, implantable controls, prosthetics, beds, and mobility devices such as wheelchairs or scooters. Moreover, the term also includes input devices that are used to control other devices such as those that are listed above. Exemplary input devices include, but are not limited to, wheels, joysticks, levers, buttons, keyboard keys, trackpads, and trackballs. In one aspect, the device may include a virtual reality rendering unit 200. In certain aspect, the brain computer interface may be communicatively connected to the virtual reality rendering unit 200 so that the brain computer interface is configured to control the virtual representation of the user in the virtual environment to cause an interaction between the virtual representation of the user and a virtual object.

For example, when the visual representation of the user 230 interacts with the virtual fireplace in the virtual reality environment 220, the signal control unit 120 communicates the thermal information associated with the virtual fireplace to the sensory stimulation unit 130. A sensory stimulator 140 thermally stimulates the area of the user's actual body 160 to which the sensory stimulator is attached based on the received thermal information so that the user 160 can experience the temperature change in reality through the interaction in the virtual reality between the visual representation of the user 230 and the virtual object 240.

In one aspect, the virtual reality rendering unit 200 may include a database 210 including information and/or digitalized information of the virtual reality environment and virtual objects 240 constituting the virtual reality environment 220. In some aspect, the database 210 may store sensory information 250 paired with the virtual objects and/or any interaction combinations between virtual objects 240 and the virtual representation of the user 230. In various aspects, the signal control unit 120 may determine types of sensory information 250 based on the sensory stimulators connected to the user's actual body. The signal control unit 120 may communicate the determined sensory information with the virtual reality rendering unit 200. The virtual reality rendering unit 200 may locate the determined sensory information paired with any interaction combinations between virtual objects 240 and the virtual representation of the user 230 in the database.

Figure 2:
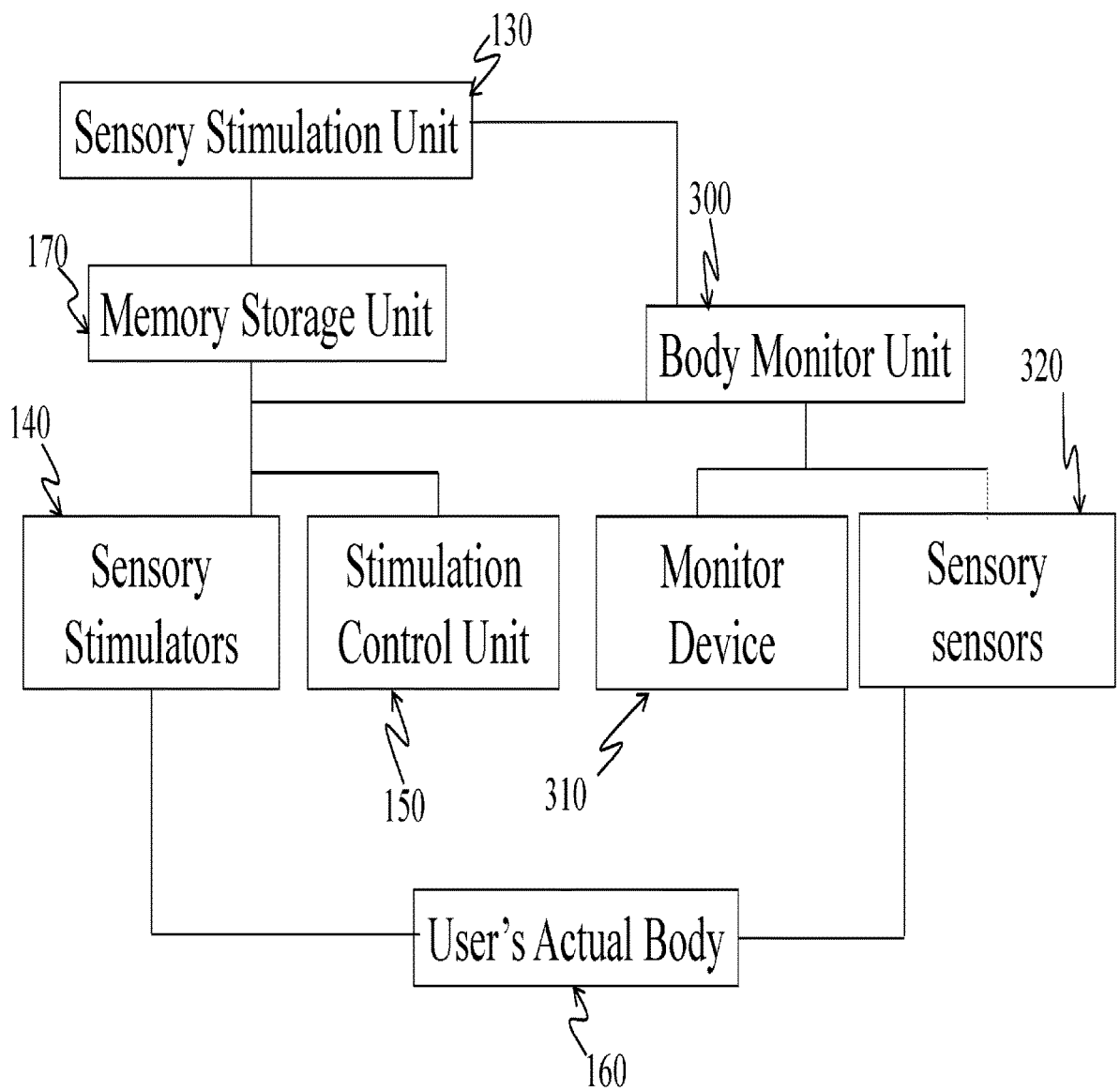
FIG. 2 shows a block diagram according to another embodiment of the disclosure.

The sensory stimulation unit 130 may include a stimulation control unit 150. The stimulation control unit 150 may be configured to adjust the degree of stimulation of one or more stimulators. The sensory stimulation unit 130 may include a memory storage unit 170 as shown in FIG. 2. A series of stimulation data applied to the user may be stored in the memory storage unit. Based on the stored stimulation data, the stimulation control unit 150 may adjust the degree of stimulation of one or more stimulators. In one aspect, the stimulation control unit 150 may incrementally adjust the degree of stimulation of one or more stimulators when the same type of stimulation is repetitively applied to the same location of the user's actual body 160. In some aspect, when the same body part is repetitively stimulated, the stimulation control unit 150 may incrementally increase or decrease the degree of stimulation of one or more stimulators connected to the same body part.

According to the disclosure, the user can experience a realistic interaction between the virtual body and the virtual object via the sensory stimulators. It is possible that an interaction between a virtual object 240 and the virtual representation of the user 230 involves a plurality of sensory information. To achieve realistic interaction, in one aspect, a virtual object may be paired with a plurality of sensory information. For example, a single interaction may be paired with a plurality of sensory information such as olfactory information, thermal information, and tactile information. When a plurality of sensory information are involved, the actual body can simultaneously experience the plurality of sensory information via the various types of stimulators attached to the actual body. Additionally, because each of virtual objects may be paired with one or more sensory information with respect to each other, even if the interaction involves the same part of the virtual body, the interactions with different virtual objects may have different combinations of sensory information. Alternatively, even if the interaction involves the same virtual object, the interaction may be paired with a different combination of sensory information depending on the predetermined sensory information associated with the interaction between the virtual object and the virtual representation of the user.

Figure 3:
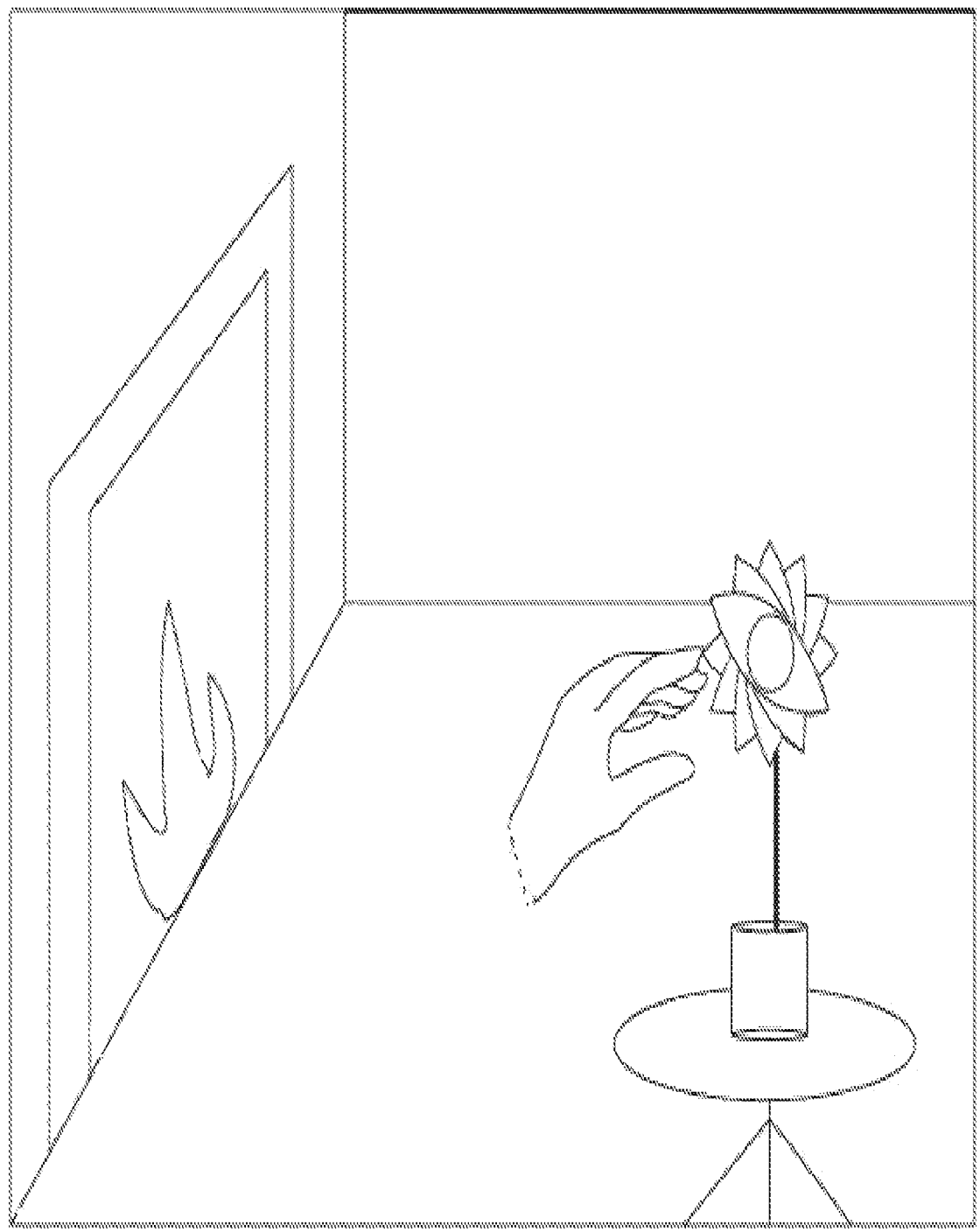
FIG. 3 shows an illustrative example according to the disclosure.

FIG. 3 exemplifies a case where a single interaction may involve a plurality of sensory information such as olfactory information and tactile information. The virtual flower may be paired with olfactory information such as fragrance together with tactile information such as pressure in the database. As the virtual representation interacts with the virtual flower, the virtual reality rendering unit 200 may look for the sensory information associated to the interaction. As the olfactory information and tactile information are determined, the sensory information is communicated with the olfactory stimulator attached to the actual olfactory organ and the tactile stimulator attached to the muscle of the user if such stimulators are placed in the desired locations in the user's body.

In another embodiment according to the disclosure, a virtual representation of the user in the virtual reality system 100 may represent a virtual body 230 of the user corresponding to the actual body 160 of the user. In some aspect, at least part of the user's actual body 160 may be virtually represented in the virtual reality environment 220. In various aspect, a three dimensional representation of at least part of the user's actual body 160 may be virtually represented in the virtual reality environment 220.

The database 210 may contain sensory information of the virtual reality system 100. In certain aspect, the database may contain sensory information of virtual objects. In various aspects, the database may contain sensory information associated with the interaction of the virtual representation and virtual objects. In one aspect, the sensory information of the part of the virtual body 230 may be updated in the database as the virtual body part interacts with a virtual object 240. In another aspect, the sensory information may be programmably stored so that the sensory information can be updated if desired as the sensory information of the actual body and/or the sensory stimulators are updated.

Figure 4:
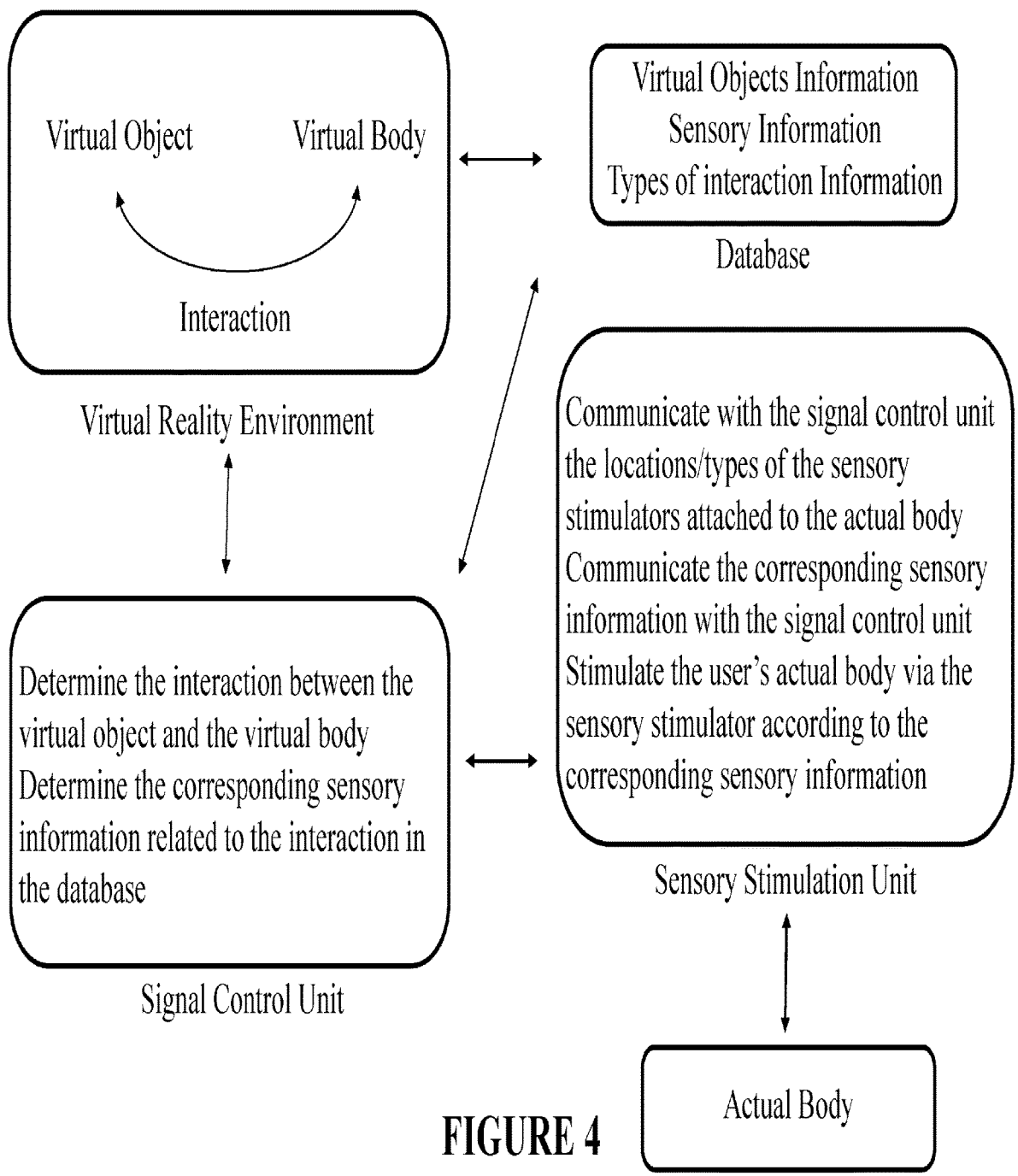
FIG. 4 shows operating processes according to one embodiment of the disclosure.

As described in FIG. 4, the virtual reality system 100 may be configured to register or synchronize the locations and/or types of one or more sensory stimulators 140 connected in parts of the actual body 160 with the equivalent parts of the virtual body 240. The virtual body may be two dimensional or three dimensional. The sensory stimulation unit 130 may communicate the locations and/or types of the one or more sensory stimulators 140 attached to the parts of the actual body with the signal control unit 120. In one embodiment, the signal control unit 120 may determine the parts of the virtual body equivalent to the parts of the actual body 160 to which the sensory stimulator 140 is attached and/or connected. Once interaction between the part of the virtual body and the virtual object is triggered, the signal control unit 120 may determine the sensory information corresponding to the interaction stored in the database. Subsequently, the signal control unit 120 may further determine the sensory information compatible to the sensory stimulators 140 and communicate with the sensory stimulator unit 130 the sensory information corresponding to the locations and/or types of the one or more sensory stimulators 140. According to the sensory information, the sensory stimulators 140 may stimulate the part of the user's actual body.

Figure 5:
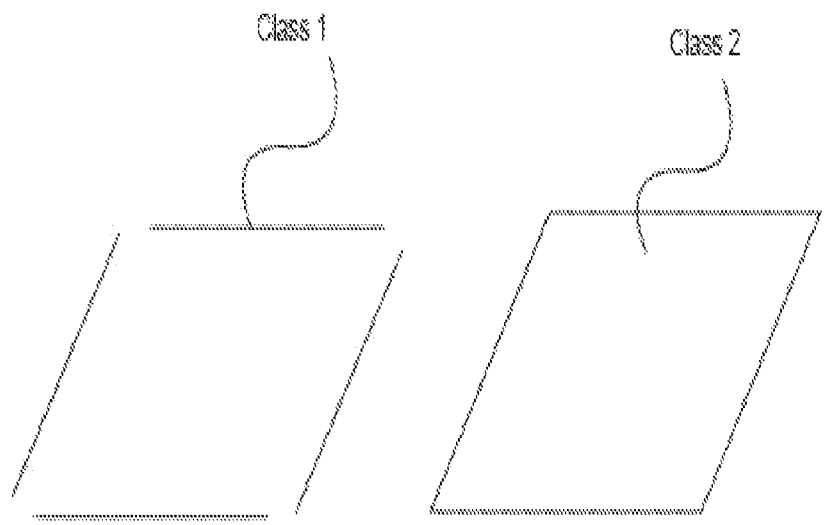
FIG. 5 shows another illustrative example according to the disclosure.
Figure 5:
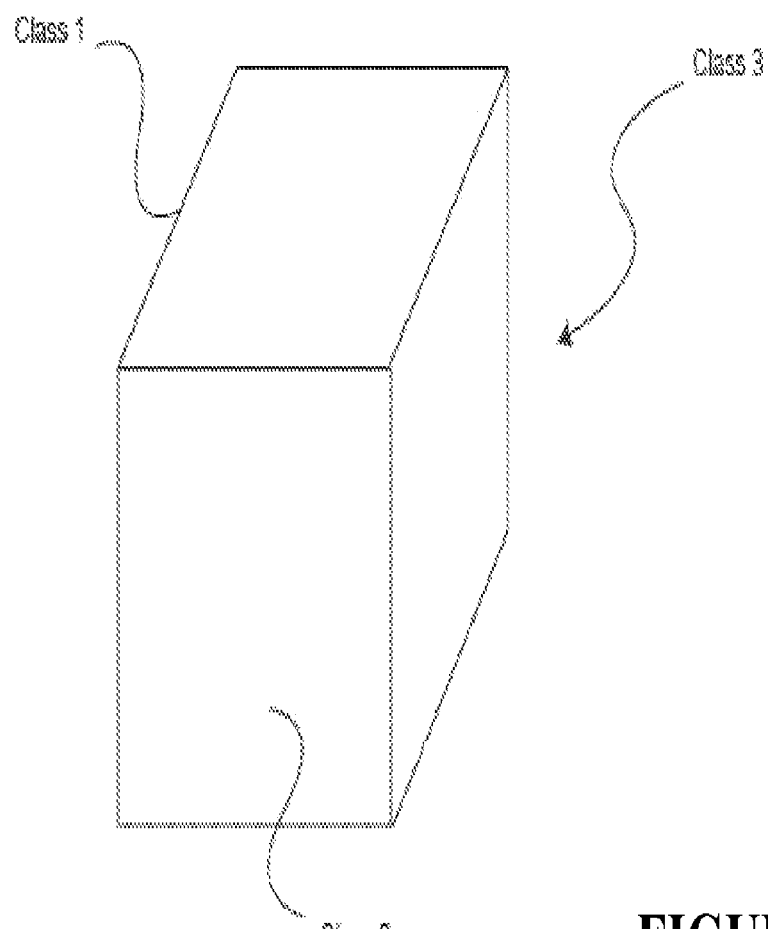

In another embodiment, a virtual object may include a plurality of sub-objects each of which has an assigned sensory information class. The database may contain a list of sensory information classes each of which has different sensory information from each other. For example, as shown in FIG. 5, a virtual cube may be constructed with faces and edges. Edges may have sensory information class, class 1. Faces may be assigned to sensory information class, class 2, wherein the class 1 is different from class 2. Every sub-object belonging to the sensory information class 2 may have the same sensory information. Similarly, every sub-object belonging to the sensory information class 1 may share the same sensory information different from the class 2. A virtual cube can be constructed with a combination of sub-objects, faces and edges, having class 1 and class 2 sensory information. When a virtual hand grabs a virtual cube in the virtual reality, a plurality of sensory information, class 1 and class 2 regarding the virtual cube can be simultaneously communicated with the real body. In some aspect, the constructed virtual object may be assigned to another sensory information, such as class 3, so that the virtual object can have sensory information of sub-objects, class 1 and class 2 together with class 3. By constructing a virtual object with various predetermined sub-objects of each of which has sensory information, an unlimited number of virtual objects each of which has a plurality of sensory information can be available.

The signal control unit 120 may be optionally connected to a body monitor unit 300 as shown in FIG. 2. The body monitor unit 300 may include a monitor device 310 connected to one or more sensory sensors 320 connected to the actual body 160 of the user. The one or more sensory sensors 320 are configured to detect the sensory signals generated in the actual body 160 of the user. In one aspect, the one or more sensory sensors 320 may be communicatively connected to the sensory stimulators 140. In some aspect, the one or more sensory sensors 320 may be integrated with the sensory stimulators 140. In various aspects, the body monitor unit 300 may be integrated with the sensory stimulation unit 130. In certain aspect, the sensory signals detected by the one or more sensory sensors 320 may be communicated to the signal control unit 120. The signal control unit 120 may update the sensory information 250 according to the detected sensory signals received from the body monitor unit 300.

In accordance with an aspect of the disclosure, a virtual reality system 100 may include a display unit 110 as shown in FIG. 1. The display unit 110 is configured to display and/or visualize the virtual reality environment 220. It should be understood that a wide variety of display units 110 may be contemplated by the disclosure. For example, such display unit 110 may include, but is not limited to, optical projectors, computer monitor display, TV display, virtual reality goggles, holographic imaging and the like. In some aspect, the display unit 110 may be communicatively connected to the signal control unit 120. The display unit 110 is utilized to project or display an image of the virtual reality environment 220 to the user of the virtual reality system 100. In some aspect, the display unit 110 may be incorporated in a Head Mounted Display or HMD. The HMD may provide covering around eyes of the user, which when worn hides any peripheral vision. The display unit 110 may be detachably connected to the virtual reality system 100.

INDUSTRIAL APPLICABILITY

The virtual reality system 100 may include digital electronic circuitry, or computer hardware, firmware, software, or combinations of them. Apparatus according to the disclosure may be implemented in a computer program product tangibly embodied in a machine-readable storage device for execution by a programmable processor, and methods steps thereof may be performed by a programmable processor executing a program of instructions to perform functions of the invention by operating on input data and generating output.

The apparatus may be advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired and in any case, the language may be a compiled or interpreted language.

Suitable processors include, by way of example, both general and special purpose microprocessors. Generally, a processor is configured to receive instructions and data from a read-only memory and/or a random access memory. Storage devices suitable for tangibly embodying computer program instructions and data include all forms of non-volatile memory devices, such as EPROM, EEPROM, and flash memory devices; magneto-optical disks, and CD-ROM disks. Any of the foregoing may be supplemented by, or incorporated in, specially-designed ASICs (application-specific integrated circuits).

The signal control unit 120 may be implemented in a general purpose computer or specialty computer or programmable circuit board or other circuitry. In one aspect, the signal control unit 120 may include a processor which may be a computer including a central processing unit (CPU), an application specific integrated circuit (ASIC), a microprocessor, a microcontroller, a field programmable gate array (FPGA), complex programmable logic device (CPLD), or other suitable processor or processing device, with associated memory or programming, for processing sensory information 250 and any other signals.

The sensory stimulation unit 130 and/or the sensory stimulators may be integrated with a wearable form of glasses, goggles, masks, clothes, bodysuits, gloves, finger covers, pants, underwear, shoes, hats, headsets, wearable accessories, attachable pads, or the like. The sensory stimulators 140 and the sensory sensors are capable of generating, detecting and/or processing sensory signals such as electric signals, olfactory signals, neural signals, gaseous signals, chemical signals, mechanical signals, vibrational signals, pressure signals, tactile signals, thermal/temperature signals, and the like.

The sensory stimulators 140 may include but be not limited to, electric stimulators, electric muscle stimulators, humidity stimulators, thermal stimulators, neural pulse stimulators, nerve stimulators, muscle vibrators, drug injectors, drug patches, air deliveries, pressurizers, chemical patches, mechanical muscle stimulators, piezo stimulators, electro-magnetic stimulators, speakers, hearing devices, and the like.

The many features and advantages of the invention are apparent from the detailed specification, and thus, it is intended by the appended claims to cover all such features and advantages of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

The invention claimed is:

1. A method for communicating sensory information with a virtual reality system, comprising:
    configuring the virtual reality system to render a virtual reality environment comprising at least one virtual object;
    configuring the virtual reality system to render a virtual representation of a user of the virtual reality system;
    configuring the virtual reality system to render at least one interaction between the virtual object and the virtual representation of the user in the virtual reality environment;

configuring the virtual reality system to process different types of interaction associated with the at least one interaction;

configuring the virtual reality system to associate the different types of interaction with the sensory information including a plurality of sensory signals associated with a plurality of stimulators at least partly integrated in a wearable form configured to at least communicatively connect with an actual body of the user;

configuring the virtual reality system to determine a type of the interaction among the different types of interaction;

configuring the virtual reality system to determine sensory information associated with the type of interaction;

configuring the virtual reality system to determine any sensory signals associated with the sensory information associated with the type of interaction;

configuring the virtual reality system to determine any types and/or locations of the plurality of stimulators at least partly integrated in the wearable form associated with the type of the interaction to stimulate the actual body of the user;

and configuring the virtual reality system to, upon the interaction, to stimulate the actual body of the user based on the determined sensory signal with the stimulators determined with the determined types and/or at the locations.

2. The method of claim 1, wherein the sensory stimulators comprise any of electric stimulators, electric muscle stimulators, humidity stimulators, thermal stimulators, neural pulse stimulators, nerve stimulators, muscle vibrators, drug injectors, drug patches, air deliveries, pressurizers, chemical patches, mechanical muscle stimulators, piezo stimulators, electro-magnetic stimulators, speakers, hearing devices.

3. The method of claim 1, comprising:
further configuring the virtual reality system to stimulate eyes of the user with visual information.

4. The method of claim 1, wherein any of the sensory signals comprises any of electric signals, olfactory signals, mechanical signals, vibrational signals, pressure signals, tactile signals, gaseous signals, thermal/temperature signals, neural signals and chemical signals.

5. The method of claim 1, wherein the sensory stimulators are configured to stimulate skin, external/internal muscles and/or sensory organs of the user's actual body.

6. The method of claim 1, wherein the sensory stimulators are configured to attach to a sensory organ of the user's actual body so that the sensory organ can be electrochemically, neurologically, and/or chemically stimulated by any of the sensory simulators.

7. The method of claim 1, wherein the sensory stimulators are configured to attach to skin of the user's actual body so that the skin can be thermally stimulated by any of the sensory simulators.

8. The method of claim 1, comprising:
further configuring the virtual reality system to adjust a degree of stimulation of the stimulators.

9. The method of claim 1, wherein the virtual reality system comprises a brain computer interface configured to detect a sensory signal of the user's actual brain.

10. The method of claim 9, wherein any of the sensory signals comprises any of electrical signal and neural signal.

11. The method of claim 9, further comprising:
configuring the virtual reality system to process any of brain signals including ipsilateral motor signals, contralateral motor signals, speech signals, motor signals, attention-related signals, signals related to cortical plasticity or feedback, signals related to working memory, signals related to higher cognitive operations, signals related to auditory processing, and/or signals related to visual perception.

12. The method of claim 1, further comprising:
configuring the virtual reality system to detect a sensory signal from the actual body of the user; and
configuring the virtual reality system to update the sensory information based on the detected sensory signal.

13. The method of claim 1, further comprising:
configuring the virtual reality system to electrically stimulate the user's actual body with a neural pulse stimulator.

14. The method of claim 1, further comprising:
configuring the virtual reality system to determine any types of the plurality of stimulators at least partly integrated in the wearable form associated with the type of the interaction to stimulate the actual body of the user; and
configuring the virtual reality system to, upon the interaction, to stimulate the actual body of the user based on the determined sensory signal with the stimulators determined with the determined types.

15. The method of claim 1, further comprising:
configuring the virtual reality system to determine any locations of the plurality of stimulators at least partly integrated in the wearable form associated with the type of the interaction to stimulate the actual body of the user; and
configuring the virtual reality system to, upon the interaction, to stimulate the actual body of the user based on the determined sensory signal with the stimulators determined at the determined locations.

16. The virtual reality system configured according to claim 1.

17. A wearable form configured to connect with the virtual reality system according to claim 16, comprising the plurality of stimulators integrated in the wearable form to communicatively connect with the actual body of the user, wherein the wearable form comprises any of glasses, goggles, masks, clothes, bodysuits, gloves, finger covers, pants, underwear, shoes, hats, headsets, wearable accessories, and attachable pads.

18. The method of claim 1, wherein the virtual reality system comprises one or more computers to implement the method, the one or more computers including any of a central processing unit (CPU), an application specific integrated circuit (ASIC), a microprocessor, a microcontroller, a field programmable gate array (FPGA), and a complex programmable logic device (CPLD).

* * * * *